United States Patent
Engel et al.

(10) Patent No.: US 10,760,926 B2
(45) Date of Patent: Sep. 1, 2020

(54) METHOD FOR PLAUSIBILITY CHECKING OF MEASURED VALUES OF A MOBILE DEVICE

(71) Applicant: VOLKSWAGEN AKTIENGESELLSCHAFT, Wolfsburg (DE)

(72) Inventors: Monique Engel, Braunschweig (DE); Bernd Rech, Bokensdorf (DE); Stefan Gläser, Braunschweig (DE); Teodor Buburuzan, Braunschweig (DE); Hendrik-Jörn Günther, Hannover (DE); Sandra Kleinau, Rötgesbüttel (DE); Bernd Lehmann, Wolfsburg (DE)

(73) Assignee: VOLKSWAGEN AKTIENGESELLSCHAFT, Wolfsurg (DE)

( * ) Notice: Subject to any disclaimer, the term of this patent is extended or adjusted under 35 U.S.C. 154(b) by 332 days.

(21) Appl. No.: 15/571,871

(22) PCT Filed: Jan. 25, 2016

(86) PCT No.: PCT/EP2016/051466
§ 371 (c)(1),
(2) Date: Nov. 6, 2017

(87) PCT Pub. No.: WO2016/177481
PCT Pub. Date: Nov. 10, 2016

(65) Prior Publication Data
US 2018/0136008 A1  May 17, 2018

(30) Foreign Application Priority Data

May 7, 2015 (DE) .......... 10 2015 208 507
Oct. 14, 2015 (DE) .......... 10 2015 219 933

(51) Int. Cl.
*G01C 25/00* (2006.01)
*H04W 4/70* (2018.01)
(Continued)

(52) U.S. Cl.
CPC .......... *G01C 25/00* (2013.01); *G01D 18/00* (2013.01); *G08G 1/0112* (2013.01); *H04W 4/40* (2018.02);
(Continued)

(58) Field of Classification Search
CPC .......... G01C 25/00; H04W 4/46; H04W 4/44; H04W 4/70; H04W 4/40; H04W 74/0841;
(Continued)

(56) References Cited

U.S. PATENT DOCUMENTS

| | | | |
|---|---|---|---|
| 8,169,338 B2 | 5/2012 | Mudalige | |
| 2008/0284575 A1* | 11/2008 | Breed | B60C 23/0493 340/438 |
| 2016/0249180 A1* | 8/2016 | Li | G08G 1/096775 |

FOREIGN PATENT DOCUMENTS

| | | |
|---|---|---|
| CN | 101650873 A | 2/2010 |
| CN | 103761889 A | 4/2014 |

(Continued)

OTHER PUBLICATIONS

Search Report for International Patent Application No. PCT/EP2016/051466, dated Apr. 19, 2016.

*Primary Examiner* — Regis J Betsch
(74) *Attorney, Agent, or Firm* — Barnes & Thornburg LLP

(57) ABSTRACT

A method for plausibility checking of measured values of a mobile device wherein sensor equipment of the mobile device generates at least one measured value, at least two pieces of information regarding the at least one measured value are received from the mobile device via a communi- (Continued)

cation service, and the at least one measured value is checked for plausibility based on the at least two pieces of information.

17 Claims, 2 Drawing Sheets

(51) Int. Cl.
| | | |
|---|---|---|
| H04W 4/40 | (2018.01) | |
| G08G 1/01 | (2006.01) | |
| H04W 4/46 | (2018.01) | |
| H04W 4/44 | (2018.01) | |
| G01D 18/00 | (2006.01) | |
| G08G 1/0967 | (2006.01) | |
| H04W 74/08 | (2009.01) | |

(52) U.S. Cl.
CPC ............... *H04W 4/44* (2018.02); *H04W 4/46* (2018.02); *H04W 4/70* (2018.02); *G08G 1/09675* (2013.01); *G08G 1/096741* (2013.01); *H04W 74/0841* (2013.01)

(58) Field of Classification Search
CPC ................. G01D 18/00; G08G 1/0112; G08G 1/096741; G08G 1/09675
See application file for complete search history.

(56) References Cited

FOREIGN PATENT DOCUMENTS

| | | | | |
|---|---|---|---|---|
| DE | 102006043317 | A1 | 3/2008 | |
| DE | 102007009335 | * | 8/2008 | |
| DE | 102007009335 | A1 | 8/2008 | |
| DE | 102010006084 | A1 | 10/2010 | |
| DE | 102010002092 | A1 | 12/2010 | |
| DE | 102010015686 | A1 * | 10/2011 | ............ G08G 1/161 |
| DE | 102010023603 | * | 12/2011 | |
| DE | 102011077998 | A1 | 1/2012 | |
| DE | 102010049093 | A1 | 4/2012 | |
| DE | 102012224110 | * | 6/2014 | |
| EP | 2385511 | * | 10/2011 | |
| EP | 2385508 | * | 11/2011 | |
| EP | 2385508 | A2 | 11/2011 | |
| WO | 2009158211 | A2 | 12/2009 | |

* cited by examiner

METHOD FOR PLAUSIBILITY CHECKING OF MEASURED VALUES OF A MOBILE DEVICE

PRIORITY CLAIM

This patent application is a U.S. National Phase of International Patent Application No. PCT/EP2016/051466, filed 25 Jan. 2016, which claims priority to German Patent Application Nos. 10 2015 208 507.4, filed 7 May 2015, and 10 2015 219 933.9, filed 14 Oct. 2015, the disclosures of which are incorporated herein by reference in their entireties.

SUMMARY

Illustrative embodiments relate to a method for checking the plausibility of measured values from a mobile device, to a control device for a vehicle, to a vehicle having a control device, and to a mobile device.

BRIEF DESCRIPTION OF THE DRAWINGS

The disclosed embodiments are explained below based on the associated drawings, in which.

DETAILED DESCRIPTION

Figure 1:
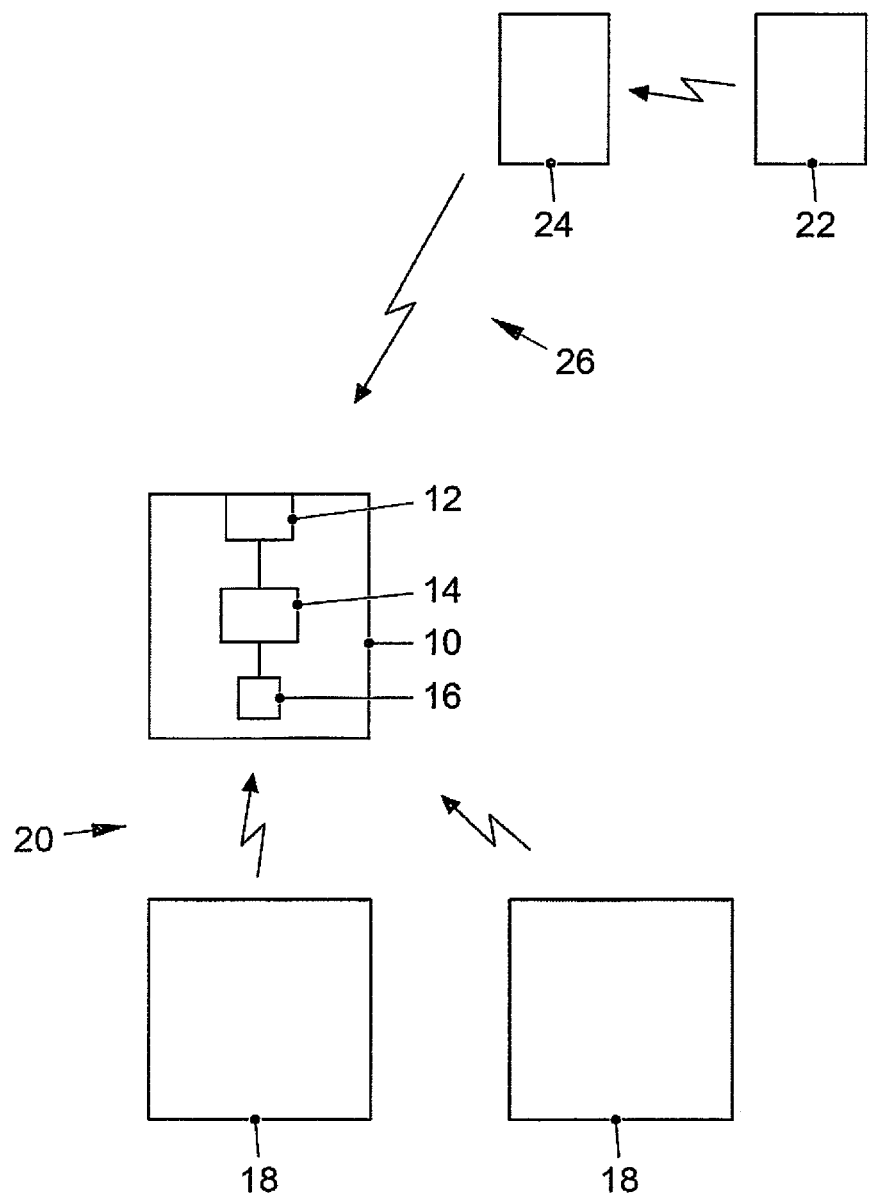
FIG. 1 shows a schematic illustration of a plurality of mobile devices communicating with one another.

Sensor systems of mobile devices, for example, vehicles, mobile radio devices, navigation devices etc., generate data which are processed further by systems of the mobile device. Methods which transmit the information generated by a vehicle sensor system to a backend of the vehicle manufacturer and process the information further there (XFCD) are known. Various methods are known for the purpose of checking the plausibility of vehicle sensor data, for example, a check to determine whether a defined range of values has been left or whether there are jumps in the values. No reference data valid for the current location and the current time have previously been available in the vehicle.

The disclosed embodiments improve the process of checking the plausibility of measured values from mobile devices.

This is achieved by a method, a control device, a vehicle, and a mobile device.

The disclosed method for checking the plausibility of measured values from a mobile device comprises the fact that a sensor system of the mobile device generates at least one measured value, that at least two items of information relating to the at least one measured value are received by the mobile device via a communication service, and that the plausibility of the at least one measured value is checked on the basis of the at least two items of information.

In the disclosed method, a mobile device uses external information coming from other devices to check the plausibility of the measured values or measurement results from its own sensor system. This allows an increase in the security and reliability of the sensor system and of the entire operation of the mobile device. The concept of the disclosure is, for example, in the automotive sector, that an ego vehicle equipped with V2X technology (V2X means vehicle-to-vehicle communication or vehicle-to-infrastructure communication or communication between a vehicle and another unit on the receiving side) uses the V2X information from the V2X vehicles in the local environment not only for safety and assistance functions and to generate new information but also to check the plausibility of its own sensor data. V2X vehicles regularly transmit information, for example, status information up to ten times per second according to ETSI and SAE standards and information relating to events which can be received from other vehicles, roadside stations and accordingly equipped mobile devices.

It is generally possible for V2X vehicles to supplement their own sensor information with V2X information from other vehicles, to process this information and to transmit it to a backend. A telematics service operator, for example, a vehicle manufacturer, can virtually increase its vehicle fleet in this way, which can be referred to as it were as V2X swarm data, and can also concomitantly take into account vehicles in other fleets. The data from V2X vehicles available in the backend can also be used to check the plausibility given sufficient accuracy and up-to-dateness. The backend can additionally provide further values for plausibility checking, which values come from a plurality of sources and have possibly been preprocessed and/or combined, for example, from vehicles, mobile devices and a roadside sensor system. In addition, the information transmitted by an ITS roadside station (IRS) can also be used to check the plausibility given sufficient accuracy and up-to-dateness.

To receive the at least two items of information by the communication service, the mobile device can communicate with other mobile devices, stationary infrastructure units and/or a computer unit of the mobile device manufacturer. The computer unit of the mobile device manufacturer may be, for example, a backend of a vehicle manufacturer or telematics service operator or a computer and/or a database in the backend. The incorporation of these different users or data sources allows great scalability and flexibility of the method.

The measured value can be assessed to be plausible if a difference between the measured value and the at least two items of information is within predefined limits. The plausibility check can be carried out easily and quickly by simply comparing the measured value with the at least two items of information or comparing the measured value and the at least two items of information with one or more limit values.

The at least two items of information can relate to the same measurement variable of the measured value, and/or variables which relate to the measurement variable of the measured value can be derived from the at least two items of information. The information may come, for example, from identical sensor systems of other mobile devices or from different sensor systems but may relate to the same measurement variables or physical variables. On the other hand, it is possible to derive measurement variables from the information relating to other variables, for example, because these other variables are more reliable or are available in a larger number or in a number which is easy to handle. For example, the acceleration can be derived from the speed. In this case, the term "difference" should not only be understood in the strictly mathematical sense.

Only information from other mobile devices and/or stationary infrastructure units can be used if the other mobile devices and/or stationary infrastructure units are classified as relevant. The robustness of the method can therefore be increased since only information which can actually contribute to the plausibility check are permitted for the latter. For example, information from devices which exceed a particular distance to the mobile device can be classified as irrelevant. Different relevance criteria can be created for different measured values.

If a plurality of groups of measurement variables are identified when checking other mobile devices and/or stationary infrastructure units, the spatial situation of the other mobile devices and/or stationary infrastructure units can be investigated, and only measurement variables of that group whose spatial situation corresponds to the mobile device can be used. This also allows partially contradictory information or measurement variables to be used by selecting the spatial relationship to the mobile device as the criterion. These may be, for example, roads or lanes on which the mobile devices are situated.

The information may contain a time stamp, which allows extended control of the information processing, for example, temporal control of the plausibility check.

The frequency of the plausibility check can be stipulated, which can be carried out for each measurement variable, for example. The accuracy can be increased or computing power can be saved, on the other hand, by stipulating the frequency.

The information can be transmitted in a synchronized manner, for example, on the basis of a global navigation satellite system (GNSS). This makes it possible to avoid collisions between information and messages. Unsynchronized communication is also possible.

Provision may be made for information to be used only if it satisfies predetermined criteria. For example, it is possible to use a restriction to certain measurement variables which do not change or scarcely change in the immediate environment of the vehicle, for example, temperature, or which can be converted, for example, the air pressure.

The communication service may comprise a mobile radio service, vehicle-to-vehicle communication and/or vehicle-to-infrastructure communication. The method is beneficial for such services for mobile devices since both mobile radio devices and vehicles or their components or control devices, for example, navigation systems, often comprise various sensor systems, the measured values from which can be subjected to a plausibility check.

The mobile device operation can be continued if the plausibility of a measured value is successfully checked, and an error message can be generated and/or intervention in the mobile device operation can be carried out if the plausibility of a measured value is unsuccessfully checked. The method runs in the background, that is to say in a manner unnoticed by the user of the mobile device, until the plausibility of a measured value cannot be checked. In that case too, it is also possible to distinguish between safety-relevant functions, in which information is provided and/or intervention is carried out, and comfort functions, in which information is not provided and/or intervention is not carried out.

The disclosed control device for a vehicle is set up to carry out a method described above. The same benefits and modifications as described above apply.

The disclosed vehicle having a sensor system for generating at least one measured value comprises a control device as described above. The same benefits and modifications as described above apply.

The disclosed mobile device is set up to carry out a method described above, the mobile device being able to be a mobile radio device, a navigation device, a mobile computer and/or a vehicle. The same benefits and modifications as described above apply.

The various disclosed embodiments which are mentioned in this application can be combined with one another unless stated otherwise in the individual case.

FIG. 1 shows a mobile device, here a vehicle 10 in this example, for example, an automobile, a truck, a motorcycle, a bus or a train. All land vehicles, aircraft and watercraft are considered to be a vehicle here. The vehicle 10 contains a sensor system 12, for example, a radar sensor or a camera. The sensor system may be a fixed part of the vehicle 10 or may be carried in the vehicle 10 and coupled to the latter, for example, a mobile radio or navigation device. The sensor system 12 generates measured values for particular measurement variables, for example, speed. These measured values are transmitted to a computing unit or a control device 14 of the vehicle 10. For this purpose, the control device 14 and the sensor system 12 are connected to one another in a wired or wireless manner. The computing unit or the control device 14 may also be arranged outside the vehicle 10, with the result that the sensor data are transmitted from the vehicle 10 to a corresponding external unit.

The vehicle 10 also contains a communication unit 16 which communicates with the control device 14 and makes it possible for the vehicle 10 and further vehicles 18, which are identical or similar to the vehicle 10, to participate in a communication service 20. The further vehicles 18 likewise contain one or more sensor systems which may be identical or similar, one or more control devices and a communication unit. The communication service 20 is, for example, a V2X or vehicle-to-X service or a mobile radio service. Such services are referred to, for example, as car-to-car systems, car-to-infrastructure systems or car-to-X systems, where the X is a placeholder for any desired infrastructure devices, other vehicles and other road users. Further conventional designations are car2C, car2X, C2C and C2X systems, vehicle-to-vehicle systems (V2V), vehicle-to-infrastructure systems (V2I) or vehicle-to-X systems (V2X).

The vehicles 18 communicate directly with the vehicle 10 which can also be referred to as the ego vehicle since the method is described below from the point of view of this vehicle 10. It is likewise possible for further vehicles, for example, the vehicle 22, to communicate indirectly via a backend 24 of the vehicle manufacturer, for example. The backend can additionally provide further values for plausibility checking, which values come from a plurality of sources and have possibly been preprocessed, for example, from vehicles, mobile devices and a roadside sensor system.

Communication between the backend 24 and the vehicle 10 takes place via a communication service 26 which may be identical to the communication service 20. Alternatively, it is possible to use another communication service, for example, a mobile radio service. Instead of the backend 24 shown here, another stationary device such as an infrastructure unit, for example, traffic lights or a transmission mast, can also communicate with the vehicle 10.

After the set-up of the communication system from FIG. 1 has first of all been described, the handling and, in particular, plausibility checking of measured values from the sensor system 12 is described below.

Figure 2:
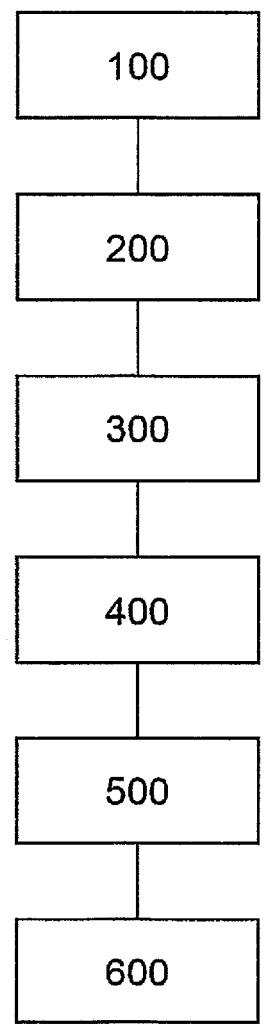
FIG. 2 shows a flowchart of a method for checking the plausibility of measured values from a mobile device.

According to the disclosure, the V2X information from other vehicles 18, 22 is used to check the plausibility of the vehicle's own sensor data. An exemplary embodiment of a method for checking the plausibility of measured values from a mobile device, here a vehicle 10, is described on the basis of FIG. 2.

In a first operation at 100, V2X information is obtained either directly from the V2X vehicles 18 in the environment (V2V, vehicle-to-vehicle) or indirectly via a backend 24 or another service, for example, a telematics or mobile radio service. Also included is the use of the V2X information from an ITS roadside station (IRS) to check the plausibility of the vehicle's own sensor data. The IRS information can then be based on measurements of a roadside sensor system, for example, the temperature, or on the information transmitted by the V2X vehicles and stored or processed further by the IRS. This results in the benefit of checking the plausibility of the measurement results from the sensor systems 12 of the ego vehicle 10 and, as a result, improving the quality of the sensor information with the aid of current V2X information, optionally directly from other V2X vehicles 18.

In this context, measurement variables are the physical or organizational variables from which sensors provide measured values. In other words, the measurement variables are categories to which the measured values belong.

A plausibility check is intended to be carried out on the basis of V2X information, for example, for the following measurement variables: measurement variables, with regard to which information from other vehicles is available, for example, from status messages (currently CAM (EU), BSM1 (USA)), from event messages (currently DEMN (EU), BSM1+2 (USA)), further message types to be expected in future (for example, environmental information, intention of the vehicle, etc.); measurement variables which are suitable on account of their physical properties, for example, scalar variables which scarcely change in the immediate environment of the ego vehicle (for example, temperature, air pressure, humidity, precipitation, etc.); measurement variables which can be converted to the location of the ego vehicle on account of known physical relationships, for example, use of the barometric height formula for the air pressure with knowledge of the height profile of the road or the speed of a vehicle traveling in front with a known distance and heading. The plausibility of derived physical variables can also be checked when using appropriate mathematical operations.

In a second operation at 200, the other V2X vehicles or information sources to be used for the plausibility check are selected, which can also be referred to as relevance filtering. V2X messages can be received over a distance of several hundred meters to more than 1 kilometer depending on local conditions. However, the messages from transmitters which are very far away are usually not suitable for checking the plausibility of ego data. It is therefore necessary to stipulate which V2X vehicles are relevant to the plausibility check. The information from irrelevant vehicles is not considered for checking the plausibility of the ego data.

The messages from vehicles within a maximum distance from the ego vehicle 10, which can also be referred to as a relevance region, are taken into account. This relevance region may be stored separately for each measurement variable, in a predefined manner and statically in the vehicle, for example, in a table, may be determined by an algorithm and/or may be stipulated in a predefined (function-specific) manner by a vehicle function.

The relevance region cannot only be defined by a distance to the ego vehicle but can also be additionally spatially restricted even further. Applications are conceivable in which the spatial direction, for example, only vehicles in the direction of travel in front of the ego vehicle, the lane, for example, only vehicles in the same lane, and/or a road segment, for example, vehicles which are only on the bridge behind the ego vehicle, are stipulated.

In a further operation at 300, the frequency of the plausibility check is stipulated or defined. Information, for example, a V2X status messages, is transmitted several times per second during operation of the vehicle. As a result, up-to-date information is continuously available, the age of which is known because the V2X message contains a time stamp. A corresponding situation can also be expected for message types to be newly developed in future. It is therefore possible to carry out a quasi-"continuous" plausibility check of the ego data or else to check the plausibility only at particular times. The frequency of the plausibility check is generally stipulated individually for each measurement variable and is then carried out according to an algorithm specific to the measured value.

The plausibility check times can be stipulated according to rules, for example, at the beginning of each journey or after predefined intervals of time, for example, at defined intervals of time from the start of a journey (for example, every 15 minutes), at defined times on the basis of the vehicle operating period (for example, every 30 minutes of the operating period) or at defined times on the basis of the operating period of a vehicle function (for example, every 5 minutes of the operating period of the cooperative ACC).

The plausibility check times can also be initiated by a vehicle function, for example, upon the activation of a driver assistance function, and/or by a backend, for example, at the beginning of an XFCD measurement order. Mixed forms of the times or intervals are likewise possible.

A "continuous" plausibility check can also be carried out permanently during operation of the vehicle.

In a further operation at 400, measurement intervals are stipulated. V2X vehicles transmit their V2X information either in an unsynchronized manner, which corresponds to concepts in ETSI and SAE standards, or in a synchronized manner, which corresponds to the concept in LTE-V.

In all cases, the vehicle clocks are synchronized on the basis of the GNSS signals. In the case of the EU and USA standards, this is then used for the time stamps of the V2X messages and, in the case of LTE-V, is additionally also used for a time slot method for accessing the radio channel. The access of the V2X vehicles to the radio channel is controlled in the V2X technologies with the aim of avoiding collisions of messages. As a result, the messages from different vehicles are received in succession. To take into account the V2X messages from different vehicles during a measurement, a measurement interval is introduced.

The length of the measurement interval for the received V2X messages is stipulated individually for each measurement variable and according to an algorithm specific to the measured value. The algorithm takes into account the expected change gradient of the measurement variable; a short measurement interval is selected for a rapid change. The number of available V2X vehicles is taken into account, thus making it possible to ensure a sufficient sample size dependent on the measurement variable. A large interval is selected in the case of a few vehicles. The algorithm also takes into account requirements as a result of the mathematical or statistical operations to be carried out with the V2X information.

The length of the measurement interval for the ego data, that is to say the sensor data from the vehicle 10, is stipulated individually for each measurement variable and according to an algorithm which is specific to the measured value and takes into account the length of the measurement interval for the V2X data and the requirements of the mathematical or statistical operations to be carried out with the ego data.

The measurement intervals for the received V2X messages and the ego data are temporally synchronized. In the case of a quasi-continuous plausibility check, the measurement intervals follow one another at short intervals, without an interval, and adjoin one another or overlap. In the last case, the following measurement interval is already started before its predecessor interval has ended. In this case, some of the V2X information and also the ego data is processed in both measurement intervals.

The stipulations in operations at 300 and 400, namely the frequency of the plausibility check and the measurement intervals, can also be already carried out before the measured values are obtained (operation at 100) and before the relevance filtering (operation at 200).

In a further operation at 500, the ego data are compared with the V2X data. The plausibility of the ego data is checked by comparing the ego data with the V2X data. The prerequisite is that the V2X data satisfy defined criteria. These comprise minimum demands imposed on the sample size and minimum demands imposed on the accuracy class of the V2X data. The sample size should be considered in the context of the respective plausibility check, but should be at least two or three.

If these criteria are not satisfied, a plausibility check cannot be carried out. For this case, it is necessary to stipulate how to proceed further, for example, by repeating the measurements of ego data and V2X data after a waiting time, for example, an immediate repetition, a repetition after a statically predefined waiting time or a repetition after a random time. An automatic repetition of the measurements of ego data and V2X data also cannot be provided, but rather waiting for a new measurement order is carried out, for example, at a stipulated plausibility check time, initiated by a vehicle function, for example, upon activation of a driver assistance function, or initiated by a backend, for example, at the start of an XFCD measurement order.

Provision is also made for the data to be available in a suitable form and to be possibly accordingly preprocessed, for example, with regard to their dimension, accuracy and/or mathematical operations to be carried out, for example, averaging within the measurement interval.

A comparison requires the stipulation of an assessment measure and the definition of when data are plausible and when they are not. This assessment measure should be stipulated individually for each measurement variable and on the basis of the mathematical operations performed before the comparison, for example, averaging, variance determination, min/max value determination.

A check is carried out to determine whether or not the difference between the V2X data preprocessed with the aid of mathematical algorithms and ego data is within predefined limits. If the difference is within the limits, the ego data are plausible, otherwise they are not.

Two statements come into consideration as the result of the comparison of the ego data with the V2X data from other vehicles. On the one hand, it is possible to state that the sensor data from the ego vehicle are plausible because the conditions defined for this purpose have been met. The vehicle operation can be continued as planned. On the other hand, it is possible to state that the sensor data from the ego vehicle are not plausible because the conditions defined for this purpose have been satisfied and the conditions defined for the plausibility check have not been satisfied. For this situation, it is necessary to stipulate how to proceed further. The causes of the "non-plausible sensor data" result may be, for example, errors in the sensor data from the ego vehicle, errors in one or more V2X vehicles in the relevance region, information from one or more V2X vehicles in the relevance region is unsuitable for the plausibility check because the relevance region has been unfavorably selected or the local situation does not produce a clear image, but rather two groups of V2X data, for example. This could be the case, for example, in a temperature measurement when the vehicles in one lane are traveling in the sun and the vehicles in another lane are traveling in the shade which is caused by roadside structures or a noise protection wall, for example.

The subsequent strategy may be the analysis of the V2X information processed in the measurement interval and/or a repetition of the plausibility check for a subsequent measurement interval.

In a further operation at 600, the V2X information processed in the measurement interval is analyzed. The V2X information processed in the measurement interval can fundamentally be analyzed before the plausibility check, to already exclude errors in advance, or only if necessary, that is to say in the event of the "non-plausible sensor data" result.

The analysis consists, for example, of analyzing the distribution of the measured values of the V2X data. In this case, mathematical operations which identify "outliers" or else groups of vehicles with similar data are carried out. In this case, the expected scattering of the measured values should be taken into account. In the case of a sample of ten V2X vehicles, for example, the result could be, for example, a distribution of nine vehicles, the measured values from which are close together with little scattering, and one vehicle, the value from which differs considerably. This vehicle could then be rejected for the evaluation in the sense of the disclosure.

However, the result could also be, for example, two groups of vehicles in which the values from the vehicles within one group are close together, but the groups differ considerably in accordance with the example with the temperature measurement variable, as already described.

In this case, a further analysis operation is carried out, namely the analysis of vehicle groups. The reason for forming vehicle groups with different V2X data in each case often lies in differences in the specific spatial situation even though all of these vehicles are in the relevance region. If the reasons for the different spatial situation can be identified, an extended strategy can be used. This may involve assessing whether the ego vehicle is in the same situation as the vehicles in one of the groups and restricting the evaluation to the data from the vehicles in this group.

With regard to assessing whether the ego vehicle is in the same situation as the vehicles in one of the groups, the spatial situation is analyzed, which takes into account whether the vehicles in one group are traveling in the same lane, the vehicles in one group are traveling spatially close together, the groups are spatially separated, the groups are traveling in different lanes and/or the groups are traveling on different road segments, for example, one group on a bridge and the other in front or behind. For this analysis, it would be possible to resort to data from the backend, for example, highly accurate map data. These data can then be actively requested by the ego vehicle.

The intention is to exclude the situation in which a one-off random "non-plausible sensor data" result is not present. Therefore, after excluding the external influences described above, the result is intended to be available several times in succession so that it can be considered to be true. The required frequency of the result depends on the respective plausibility check, but should be at least two or three. Instead of repeatedly considering the result from an identical calculation, it may also be possible to consider the result from other measurements which also take place at the same time.

This may also include the derivation from other measurement variables, for example, an acceleration from a speed.

If the result is intended to be available several times in succession, the number of repetitions, the interval of time between the repetitions, the number of "non-plausible sensor data" results and/or the extent to which the results must follow one another are stipulated for this purpose.

If the "non-plausible sensor data" result is confirmed, further processing is carried out with the provision of an appropriate item of information for the vehicle functions, for example, in an error memory, a possible emergency strategy of the vehicle functions is initiated—this is dependent on the function and the measurement variable—and/or an error display is effected in a user interface (human-machine interface, HMI), for example, a warning or information display.

The disclosed method is used, for example, in mobile devices and/or vehicles.

LIST OF REFERENCE SYMBOLS

10 Vehicle
12 Sensor system
14 Control device
16 Communication unit
18 Vehicle
20 Communication service
22 Vehicle
24 Backend
26 Communication service
100 Operation
200 Operation
300 Operation
400 Operation
500 Operation
600 Operation

The invention claimed is:

1. A method for checking the plausibility of measured values from a mobile device, the method comprising:
   generating, by a sensor system of the mobile device, at least one measured value;
   receiving at least two items of information relating to the at least one measured value by the mobile device via a communication service; and
   checking the plausibility of the at least one measured value based on the at least two items of information,
   wherein only information from other mobile devices and/or stationary infrastructure units is used in response to the other mobile devices and/or stationary infrastructure units are classified as relevant, and
   wherein, in response to a plurality of groups of measurement variables being identified corresponding to a plurality of groups of the other relevant mobile devices and/or stationary vehicles, investigating the spatial situation of the other mobile devices and/or stationary infrastructure units, and using only measurement variables of that group of the other relevant mobile devices and/or stationary vehicles whose spatial situation corresponds to the mobile device.

2. The method of claim 1, wherein the mobile device communicates with other mobile devices, stationary infrastructure units and/or a computer unit of the mobile device manufacturer to receive the at least two items of information by the communication service.

3. The method of claim 1, further comprising assessing the measured value to be plausible in response to a difference between the measured value and the at least two items of information is within predefined limits.

4. The method of claim 1, wherein the at least two items of information relate to the same measurement variable of the measured value, and/or variables which relate to the measurement variable of the measured value are derived from the at least two items of information.

5. The method of claim 1, wherein the information contains a time stamp.

6. The method of claim 1, wherein the frequency of the plausibility check is stipulated.

7. The method of claim 1, wherein the information is transmitted synchronously.

8. The method of claim 1, wherein information is used only if the information satisfies predetermined criteria.

9. The method of claim 1, wherein the communication service comprises a mobile radio service, vehicle-to-vehicle communication and/or vehicle-to-infrastructure communication.

10. The method of claim 1, wherein the mobile device operation is continued in response to the plausibility of a measured value being successfully checked, and an error message is generated and/or intervention in the mobile device operation is carried out in response to the plausibility of a measured value is unsuccessfully checked.

11. A control device for a transportation vehicle, wherein the control device carries out a method for checking the plausibility of measured values from a mobile device, the method comprising:
   generating, by a sensor system of the mobile device, at least one measured value;
   receiving at least two items of information relating to the at least one measured value by the mobile device via a communication service; and
   checking the plausibility of the at least one measured value based on the at least two items of information,
   wherein only information from other mobile devices and/or stationary infrastructure units is used in response to the other mobile devices and/or stationary infrastructure units are classified as relevant, and
   wherein, in response to a plurality of groups of measurement variables being identified corresponding to a plurality of groups of the other relevant mobile devices and/or stationary vehicles, investigating the spatial situation of the other mobile devices and/or stationary infrastructure units, and using only measurement variables of that group of the relevant mobile devices and/or stationary vehicles whose spatial situation corresponds to the mobile device.

12. A transportation vehicle having a sensor system for generating at least one measured value, wherein the control device of claim 11 is provided.

13. The control device for the transportation vehicle of claim 11 wherein the mobile device communicates with other mobile devices, stationary infrastructure units and/or a computer unit of the mobile device manufacturer to receive the at least two items of information by the communication service.

14. The control device for the transportation vehicle of claim 11 further comprising assessing the measured value to be plausible in response to a difference between the measured value and the at least two items of information is within predefined limits.

15. The control device for the transportation vehicle of claim 11 wherein the at least two items of information relate to the same measurement variable of the measured value, and/or variables which relate to the measurement variable of the measured value are derived from the at least two items of information.

16. The control device for the transportation vehicle of claim 11 wherein the information contains a time stamp.

17. A mobile device which carries out a method for checking the plausibility of measured values from a mobile device, the method comprising:
- generating, by a sensor system of the mobile device, at least one measured value;
- receiving at least two items of information relating to the at least one measured value by the mobile device via a communication service; and
- checking the plausibility of the at least one measured value based on the at least two items of information,
- wherein only information from other mobile devices and/or stationary infrastructure units is used in response to the other mobile devices and/or stationary infrastructure units are classified as relevant,
- wherein, in response to a plurality of groups of measurement variables being identified corresponding to a plurality of groups of the other relevant mobile devices and/or stationary vehicles, investigating the spatial situation of the other mobile devices and/or stationary infrastructure units, and using only measurement variables of that group of the relevant mobile devices and/or stationary vehicles whose spatial situation corresponds to the mobile device, and
- wherein the mobile device is a mobile radio device, a navigation device, a mobile computer and/or a vehicle.

* * * * *